March 16, 1943.         J. W. SANDERSON         2,314,018
COFFEE MAKER
Filed Aug. 6, 1941         2 Sheets-Sheet 1
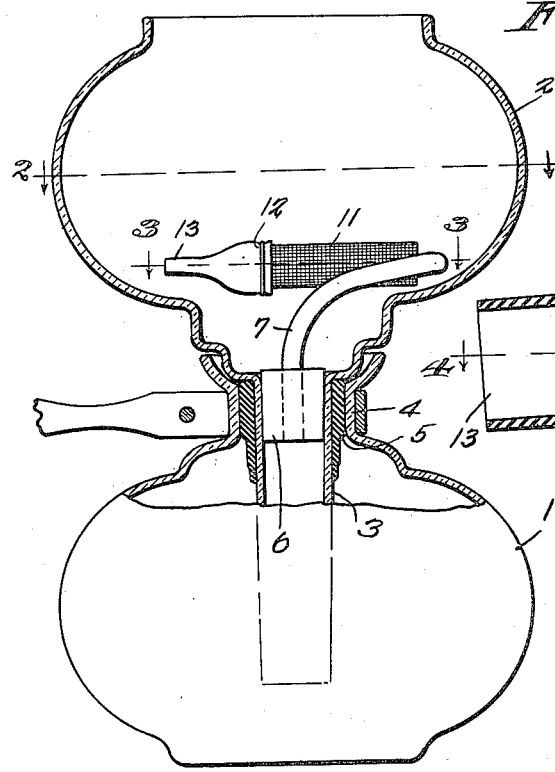
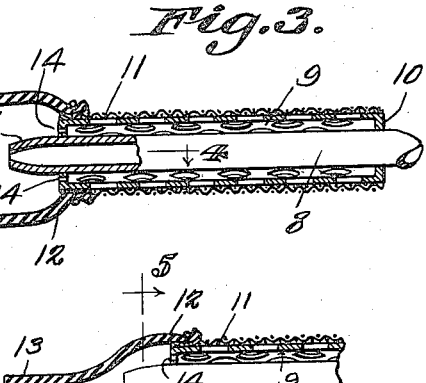
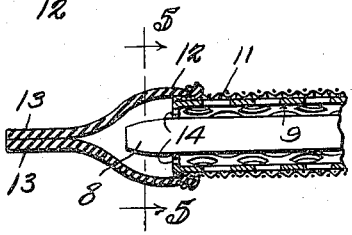
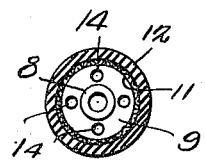
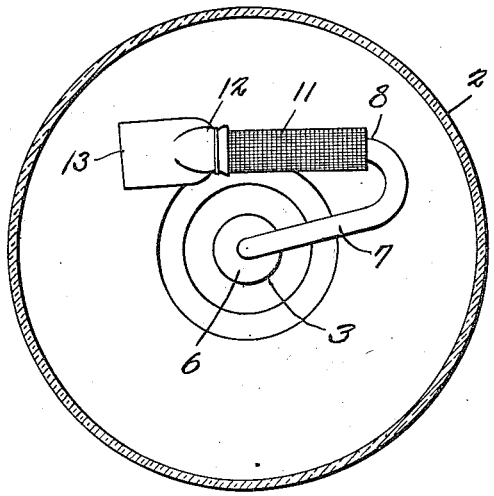
J. W. Sanderson
INVENTOR.
BY *Knowles*

March 16, 1943.  J. W. SANDERSON  2,314,018
COFFEE MAKER
Filed Aug. 6, 1941  2 Sheets-Sheet 2

J. W. Sanderson INVENTOR.
BY

Patented Mar. 16, 1943

2,314,018

UNITED STATES PATENT OFFICE 2,314,018

COFFEE MAKER

John William Sanderson, La Jolla, Calif.

Application August 6, 1941, Serial No. 405,713

10 Claims. (Cl. 53—3)

This invention relates to coffee makers and more especially to the type utilizing superposed containers. In using these devices it has been found that the liquid which rises into the upper container will support a mass of coffee grounds which floats thereon even while the liquid is boiling violently. As the grounds contain oils with little affinity for water, the floating mass fails to give up much of the aromatic oil content which otherwise would improve the strength and flavor of the beverage. To overcome this objection many manufacturers of coffee makers of this type advise the users to stir the mixture in the upper container to insure thorough saturation of all the particles and the extraction therefrom of the desirable constituents.

An object of the present invention is to provide the device with a means whereby the contents of the upper container will be thoroughly agitated so as to prevent the formation of masses of grounds and produce a stronger beverage in less time and with less coffee per volume of water, than has been possible heretofore without hand stirring.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings

Figure 1 is a view partly in section and partly in elevation showing one application of my invention.

Figure 2 is a section on line 2—2, Figure 1.

Figure 3 is an enlarged section on line 3—3 Figure 1.

Figure 4 is a section on line 4—4, Figure 3.

Figure 5 is a section on line 5—5, Figure 4.

Figure 6:
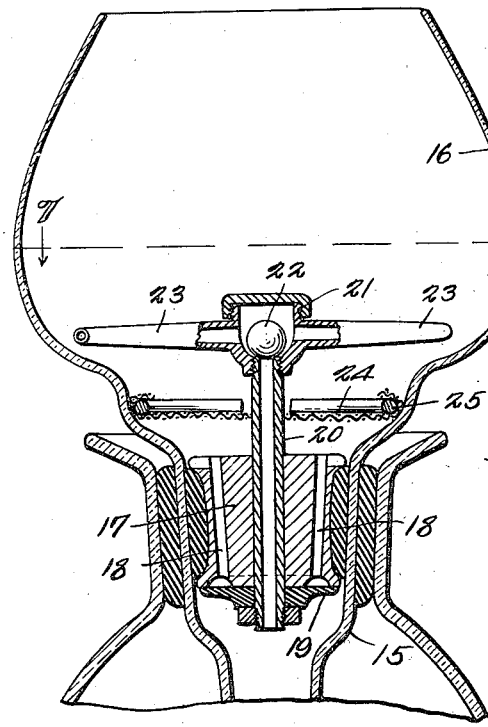
Figure 6 is a vertical section showing a modified construction.

Referring to the figures by characters of reference, 1 designates the bottom section of a coffee marker and the top section has been indicated at 2. This latter has the usual depending tubular stem 3 held detachably but firmly in the neck 4 of the member 1 by a rubber gasket 5 or the like. It is the practice, generally, to place a cloth, stem, or other filtering device across the upper end of the stem to prevent coffee grounds from gravitating from the upper section 2 to the lower section 1. In the present structure, however, a plug 6, which can be of rubber, cork or other acceptable material, is fitted snugly in the upper end of stem 3 and has the lower end of a tube 7 seated therein and extended therethrough. This tube is curved upwardly and laterally in section 2 and terminates in a contracted end or nozzle positioned to project a jet of fluid substantially in a horizontal direction close to the wall of section 2 near the bottom thereof. A perforated sleeve 9 is mounted concentrically on the nozzle and is spaced therefrom by end flanges 10. The sleeve 9, in turn, is surrounded by a jacket of filtering cloth 11.

A cap 12, formed preferably of soft rubber, is fitted tightly about the sleeve and jacket close to the outlet of the nozzle and has its free end contracted and flattened to provide opposed flat lips 13 normally contacting to form a check valve serving to prevent return flow of fluid from section 2 into the tube 8.

In practice the plug 6 is seated tightly in stem 3 and the filtering jacket 11 is applied to sleeve 9. The desired quantity of ground coffee is deposited in section 2 and the proper amount of water is put in section 1. After the stem 3 has been placed tightly in neck 4 and the water heated a pressure will be built up in section 1 sufficient to depress the water level and cause the water to be displaced upwardly through tube 7, sleeve 9 and cap 12, it being understood that the lips 13 forming the valve of the cap will move apart under the pressure exerted by the escaping water. When the level of the water in section 1 falls below the bottom of stem 3, the vapor and steam which had been generated in said section will flow through tube 7 and cap 12 and escape in the form of a jet. This jet will set up a swirling movement of the water and grounds in section 2 and insure thorough agitation and saturation of the mixture. This will continue as long as the steam is generated. Thereafter, as condensation takes place in section 1 the liquid will flow through the filtering jacket 11 into sleeve 9 and return to section 1 by way of nozzle 8 and sleeve 9, there being apertures 14 in one end of the sleeve through which communication is established between the filter and nozzle.

Figure 7:
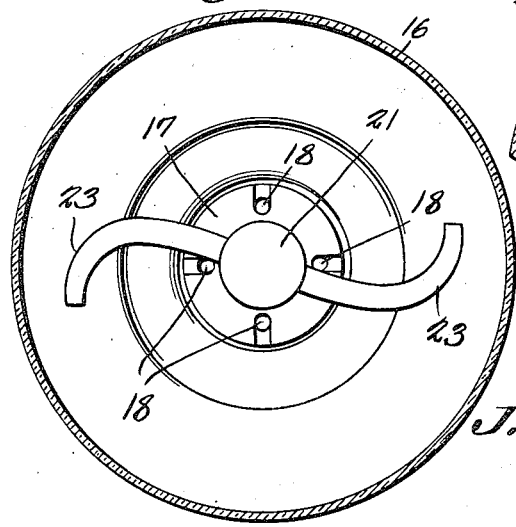
Figure 7 is a section on line 7—7, Figure 6.

In the structure shown in Figures 6 and 7 the stem 15 of the upper section 16 has a plug 17 seated therein and one or more return passages 18 are extended therethrough. These are normally closed at their lower ends by a flexible valve which can be in the form of a soft rubber disk 19 adapted to open downwardly. A tube 20 is secured in and extends through the plug and has a small valve casing 21 at its upper end housing a ball valve 22 or the like. This valve normally closes the upper end of tube 20. Oppositely extended arcuate nozzles 23 are extended from the valve 21 in a substantially horizontal plane and open into section 16 near the wall thereof.

A filtering cloth 24 or the like can be fitted around tube 20 and held to the section 1 by an expansible spring ring 25 of the usual or any preferred type.

When this form of the device is operated the liquid will rise within tube 20 and escape through nozzles 23 into the mass of ground coffee in section 16. The liquid will be followed by escaping vapor and steam which will escape in jets serving to swirl the contents of the container. After the brewing has ceased, the liquid will drain through the filtering material and return through passages 18 and past valve 19 to the lower section or container.

Figure 8:
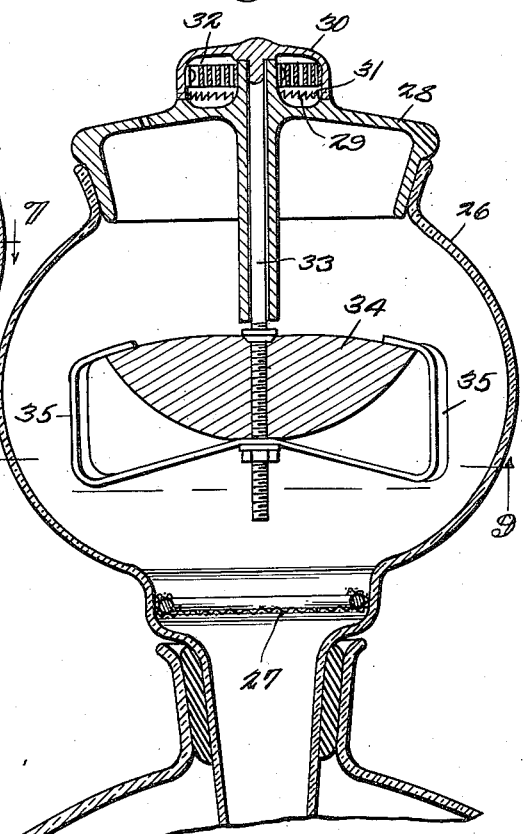
Figure 8 is a view similar to Figure 6 showing another form.
Figure 9:
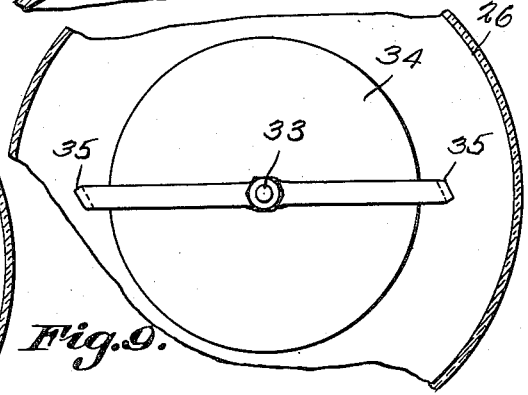
Figure 9 is a section on line 9—9, Figure 8, parts being broken away.

A mechanical stirring means has been shown in Figures 8 and 9. In this structure the upper section or container 26 is equipped with the usual filter 27. It also has a removable lid 28 provided with an annular series of ratchet teeth 29. A hollow knob 30 is also provided with an annular series of ratchet teeth 31 which normally engage the teeth 30. A coiled spring 32 in the knob is attached at one end to the lid 28 and at its other end to the knob. Thus by rotating the knob in one direction so as to cause its teeth to slip over the teeth 29, the spring can be placed under tension or wound.

A shaft 33 rotates with the knob and extends into the container or section 26. It carries a float 34 and stirring arms or blades 35.

As the liquid rises in the coffee maker it flows through the filter and ultimately reaches such a height as to lift the float 34 and knob 30. This releases the spring 32 which operates at once to rotate shaft 33 and arms or blades 35, thereby thoroughly agitating the contents of the container. When condensation takes place in the lower section or container 36 of the coffee maker, the liquid will gravitate through the filter and the float descend so as to reengage teeth 31 with teeth 29 and stop rotation of the blades 35.

Obviously many other modifications of this invention can be produced within the scope of the claims.

What is claimed is:

1. In a coffee maker upper and lower containers, a stem providing the sole means of communication therebetween and depending within the lower container, a stationary nozzle in the upper container, and means for directing fluid under pressure from the stem to the nozzle, said nozzle being positioned to deliver said fluid into the upper container outwardly away from the center of the container and against the container wall, said wall and nozzle cooperating to deflect all portions of the delivered fluid in one direction about the center of the container, thereby to swirl the contents of the upper container.

2. In a coffee maker upper and lower containers, a stem providing the sole means of communication therebetween and depending within the lower container, a stationary nozzle in the upper container, means for directing fluid under pressure from the stem to the nozzle, said nozzle being positioned to deliver said fluid into the upper container outwardly away from the center of the container and against the container wall, said wall and nozzle cooperating to deflect all portions of the delivered fluid in one direction about the center of the container, thereby to swirl the contents of the upper container.

3. In a coffee maker upper and lower containers, a stem providing the sole means of communication therebetween and depending within the lower container, a nozzle in the upper container, means for directing fluid under pressure from the stem to the nozzle, said nozzle being positioned to swirl the contents of the upper container with the fluid escaping from the nozzle, a filter mounted on the nozzle, means for maintaining communication between the filter and nozzle, and a check valve carried by said means positioned to release fluid under pressure from the nozzle directly into the upper container to swirl the contents of said container.

4. In a coffee maker the combination with an upper container having a depending stem and a lower container into which the stem extends, of a tube in the upper container opening into the stem, a stationary nozzle carried by the tube and positioned to release fluid in one direction only against the wall of the upper container thereby to swirl within the upper container, and a check valve for the nozzle.

5. In a coffee maker the combination with an upper container having a depending stem and a lower container into which the stem extends, of a tube in the upper container opening into the stem, a nozzle carried by the tube and positioned to release fluid in one direction only against the wall of the upper container thereby to swirl within the upper container, and a filter positioned to intercept fluid gravitating from the upper to the lower container.

6. In a coffee maker the combination with an upper container having a depending stem and a lower container into which the stem extends, of a tube in the upper container opening into the stem, a nozzle carried by the tube and positioned to release fluid to swirl within the upper container, a filter positioned to intercept fluid gravitating from the upper to the lower container, said filter comprising an apertured sleeve on the nozzle and a filtering material on the sleeve, and means for maintaining open communication between the filter and tube for return flow of fluid to the lower container.

7. In a coffee maker the combination with an upper container having a depending stem and a lower container into which the stem extends, of a tube in the upper container opening into the stem, a nozzle carried by the tube and positioned to release fluid to swirl within the upper container, a filter positioned to intercept fluid gravitating from the upper to the lower container, said filter comprising an apertured sleeve on the nozzle and a filtering material on the sleeve, means for maintaining open communication between the filter and tube for return flow of fluid to the lower container, said means including a cap in communication with the filter and nozzle, and a check valve carried by the cap and positioned to open under pressure of fluid from within the cap.

9. In a coffee maker upper and lower containers, a tubular stem depending from the upper container into the lower container, a plug in the stem, a tube seated therein and extending into the upper container, a stationary nozzle carried by the tube and positioned to release fluid rising within the tube to swirl the contents of the upper container, and a check valve for the nozzle.

9. In a coffee maker upper and lower containers, a tubular stem depending from the upper container into the lower container, a plug in the stem, a tube seated therein and extending into the upper container, separate nozzles carried by the tube and positioned to release fluid rising in the tube to swirl the contents of the upper container, and a check valve for the nozzles.

10. In a coffee maker upper and lower containers, a tubular stem depending from the upper container into the lower container, a plug in the stem, a tube seated therein and extending into the upper container, separate nozzles carried by the tube and positioned to release fluid rising in the tube to swirl the contents of the upper container, a check valve for the nozzles, there being a return passage in the plug, and a check valve normally closing the passage against upward flow of fluid.

JOHN WILLIAM SANDERSON.